(12) United States Patent
Park et al.

(10) Patent No.: US 9,577,252 B2
(45) Date of Patent: Feb. 21, 2017

(54) NEGATIVE ACTIVE MATERIAL AND NEGATIVE ELECTRODE AND LITHIUM BATTERY CONTAINING THE MATERIAL, AND METHOD OF MANUFACTURING THE SAME

(71) Applicant: Samsung SDI Co., Ltd., Yongin-si, Gyeonggi-Do (KR)

(72) Inventors: Sang-Eun Park, Yongin-si (KR); Young-Ugk Kim, Yongin-si (KR); Hyun-Ki Park, Yongin-si (KR); Chang-Su Shin, Yongin-si (KR); Ui-Song Do, Yongin-si (KR); Sung-Su Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 141 days.

(21) Appl. No.: 14/262,518

(22) Filed: Apr. 25, 2014

(65) Prior Publication Data
US 2015/0140359 A1    May 21, 2015

(30) Foreign Application Priority Data
Nov. 19, 2013    (KR) ......................... 10-2013-0140891

(51) Int. Cl.
*H01M 4/36*    (2006.01)
*H01M 4/04*    (2006.01)
(Continued)

(52) U.S. Cl.
CPC ........... *H01M 4/366* (2013.01); *H01M 4/0416* (2013.01); *H01M 4/0471* (2013.01);
(Continued)

(58) Field of Classification Search
None
See application file for complete search history.

(56) References Cited

U.S. PATENT DOCUMENTS

2006/0147797 A1    7/2006   Wu et al.
2007/0122701 A1    5/2007   Yamaguchi
(Continued)

FOREIGN PATENT DOCUMENTS

EP    2 648 249 A1    10/2013
JP    2006-190642 A    7/2006
(Continued)

OTHER PUBLICATIONS

Park et al., "Employment of encapsulated Si with mesoporous $TiO_2$ layer as anode material for lithium secondary batteries," *Trans. Nonferrous Met. Soc. China* 19(2009) 1023-1026.
(Continued)

*Primary Examiner* — Sarah A Slifka
(74) *Attorney, Agent, or Firm* — Knobbe Martens Olson & Bear LLP

(57)    ABSTRACT

In an aspect, a negative active material, a negative electrode and a lithium battery including the negative active material, and a method of manufacturing the negative active material is provided. The negative active material includes a silicon-based active material substrate; a metal oxide nanoparticle disposed on a surface of the silicon-based active material substrate. An initial irreversible capacity of the lithium battery may be decreased and lifespan characteristics may be improved by using the negative active material.

19 Claims, 9 Drawing Sheets

(51) Int. Cl.
*H01M 4/134* (2010.01)
*H01M 4/1395* (2010.01)
*H01M 4/38* (2006.01)
*H01M 4/62* (2006.01)
*H01M 10/052* (2010.01)

(52) U.S. Cl.
CPC ......... *H01M 4/134* (2013.01); *H01M 4/1395* (2013.01); *H01M 4/386* (2013.01); *H01M 4/62* (2013.01); *H01M 10/052* (2013.01); *Y02E 60/122* (2013.01); *Y02T 10/7011* (2013.01)

(56) References Cited

U.S. PATENT DOCUMENTS

| | | |
|---|---|---|
| 2011/0086271 A1 | 4/2011 | Lee et al. |
| 2014/0045060 A1 | 2/2014 | Park et al. |
| 2014/0057176 A1 | 2/2014 | Park et al. |

FOREIGN PATENT DOCUMENTS

| | | |
|---|---|---|
| KR | 10-2007-0053140 A | 5/2007 |
| KR | 10-2011-0040478 A | 4/2011 |
| KR | 10-2014-0026855 A | 3/2014 |
| KR | 10-2014-0022253 A | 4/2014 |

OTHER PUBLICATIONS

Extended European Search Report dated Apr. 7, 2015 for European Patent Application No. EP 14 193 545.2 which shares priority of Korean Patent Application No. KR 10-2013-0140891 with captioned U.S. Appl. No. 14/262,518.

Jeong et al., "Multifunctional $TiO_2$ coating for a SiO anode in Li-ion batteries," *J. Mater. Chem.* 22 (2012) pp. 7999-8004.

Reyes-Coronado et al,, "Phase-pure $TiO_2$ nanoparticles: anatase, brookite and rutile," *Nanotechnology* 19 (2008) 145605, pp. 1-10.

Korean Office Action dated Nov. 23, 2016 for Korean Patent Application No. KR 10-2013-0140891.

NEGATIVE ACTIVE MATERIAL AND NEGATIVE ELECTRODE AND LITHIUM BATTERY CONTAINING THE MATERIAL, AND METHOD OF MANUFACTURING THE SAME

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2013-0140891, filed on Nov. 19, 2013, in the Korean Intellectual Property Office, the disclosure of which is incorporated herein in its entirety by reference.

BACKGROUND

Field

This disclosure relates to negative active materials, negative electrodes and lithium batteries including the same, and methods of manufacturing the negative active materials.

Description of the Related Technology

Lithium secondary batteries used in portable electronic devices for information communication, such as personal digital assistants (PDAs), mobile phones, or notebook computers, electric bicycles, electric vehicles, or the like have a discharge voltage that is at least twice as high as that of a conventional battery, and thus, have high energy density.

Lithium secondary batteries generate electric energy by oxidation and reduction reactions occurring when lithium ions are intercalated/deintercalated into/from a positive electrode and a negative electrode with an organic electrolytic solution or a polymer electrolytic solution interposed between the positive and negative electrodes, each electrode including an active material that enables intercalation and deintercalation of lithium ions.

Research on various forms of carbonaceous materials such as synthetic and natural graphite, and hard carbon, which are capable of intercalation/deintercalation of lithium, and non-carbonaceous materials such as Si is of interest.

When a negative electrode material of a lithium secondary battery directly contacts an electrolyte, the electrolyte may undergo reductive cleavage at a low electric potential. Accordingly, the negative electrode material and the electrolyte of the lithium secondary battery may have increased reactively to form a thin film on a surface of the negative electrode at a low electric potential. In this regard, the higher the temperature of the battery, the greater the reactivity between the negative electrode material and the electrolyte. Due to the thin film, lithium ions and electrons are consumed, thereby deteriorating lifespan characteristics of the lithium secondary battery.

Accordingly, there is a need to develop a negative active material having improved lifespan characteristics.

SUMMARY

One or more embodiments of the present disclosure include negative active materials that may improve lifespan characteristics of lithium batteries.

One or more embodiments of the present disclosure include negative electrodes including the negative active materials.

One or more embodiments of the present disclosure include lithium batteries including the negative electrodes.

One or more embodiments of the present disclosure include methods of manufacturing the negative active materials.

Additional aspects will be set forth in part in the description which follows and, in part, will be apparent from the description, or may be learned by practice of the presented embodiments.

Some embodiments provide a negative active material including a silicon-based active material substrate; and a metal oxide nanoparticle disposed on a surface of the silicon-based active material substrate, wherein the metal oxide nanoparticle has an angle of diffraction 2θ having a peak at 27°~28° in an x-ray diffraction (XRD) pattern obtained using CuKα rays.

Some embodiments provide negative active material including: a silicon active material substrate; and metal oxide nanoparticles disposed on a surface of the silicon active material substrate, wherein the metal oxide nanoparticles include a component having a rutile phase. In some embodiments, the metal oxide nanoparticles may have an angle of diffraction 2θ having a peak at 27°~28° in an x-ray diffraction (XRD) pattern obtained using CuKα rays. In some embodiments, the silicon active material substrate may be from about 40 at % to about 90 at % silicon. In some embodiments, the metal oxide nanoparticle comprises as a main component at least one selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, and tantalum pentoxide, and wherein at least 90 wt % of the metal oxide nanoparticle is the main component. In some embodiments, an average diameter of the metal oxide nanoparticles may be about 1 nm to about 30 nm. In some embodiments, the metal oxide nanoparticles may form an island type coating layer on a surface of the silicon active material substrate. In some embodiments, an amount of the metal oxide nanoparticle may be about 0.01 wt % to about 10 wt % based on a total weight of the negative active material. In some embodiments, the silicon active material substrate comprises at least one of silicon, silicon oxide, silicon alloy, and a silicon-carbon composite. In some embodiments, the silicon active material substrate may be a silicon alloy and the silicon alloy comprises silicon and at least one metal selected from magnesium (Mg), calcium (Ca), strontium (Sr), barium (Ba), radon (Ra), scandium (Sc), yttrium (Y), lanthanum (La), titanium (Ti), zirconium (Zr), hafnium (Hf), vanadium (V), niobium (Nb), tantalum (Ta), chromium (Cr), molybdenum (Mo), tungsten (W), manganese (Mn), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), zinc (Zn), cadmium (Cd), boron (B), aluminum (Al), gallium (Ga), phosphorus (P), arsenic (As), stibium (Sb), bismuth (Bi), sulfur (S), selenium (Se), tellurium (Te), and polonium (Po). In some embodiments, the silicon active material substrate may be a silicon alloy and the silicon alloy is at least one of Si—Fe, Si—Al, Si—Mg, Si—Ti, Si—Cr, Si—Ni, Si—Cu, Si—Ti—Ni, Si—Fe—Al, Si—Fe—O, Si—Cu—Ni, Si—Mg—Ni, Si—Ti—Ni—Al, and Si—Fe—Ti—Al. In some embodiments, the silicon alloy may be represented by Si-M'-M", Si may be included in a range of about 40 at % to about 80 at %, M' may be included in a range of about 10 at % to about 30 at %, and M" may be included in a range of about 10 at % to about 30 at %, where M' may be Al, Ti, or Fe, and M"

is Ni, Fe, or Mn, and where M' and M" are different from each other. In some embodiments, the silicon active material substrate may be in the form of particles and the particles have an average diameter of about 0.1 μm to about 100 μm.

According to one or more embodiments of the present disclosure, the metal oxide nanoparticles may include a component having a rutile phase.

According to one or more embodiments of the present disclosure, the metal oxide nanoparticle may include an oxide of at least one metal selected from elements belonging to Group 2 to Group 13.

According to one or more embodiments of the present disclosure, the metal oxide nanoparticle may include at least one oxide of a metal selected from the group consisting of titanium (Ti), zirconium (Zr), nickel (Ni), cobalt (Co), manganese (Mn), chromium (Cr), zinc (Zn), molybdenum (Mo), tantalum (Ta), boron (B), magnesium (Mg), calcium (Ca), strontium (Sr), barium (Ba), vanadium (V), iron (Fe), copper (Cu), and aluminum (Al).

According to one or more embodiments of the present disclosure, the metal oxide nanoparticle may include a metal oxide represented by Formula 1 below:

$$M_aO_b \qquad \text{Formula 1}$$

wherein, $1 \leq a \leq 4$, $1 \leq b \leq 10$, and

M may be at least one selected from the group consisting of titanium (Ti), zirconium (Zr), nickel (Ni), cobalt (Co), manganese (Mn), chromium (Cr), zinc (Zn), molybdenum (Mo), tantalum (Ta), boron (B), magnesium (Mg), calcium (Ca), strontium (Sr), barium (Ba), vanadium (V), iron (Fe), copper (Cu), and aluminum (Al).

According to one or more embodiments of the present invention, the metal oxide nanoparticle may include at least one selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, and tantalum pentoxide.

According to one or more embodiments of the present disclosure, the metal oxide nanoparticle may include titanium oxide having a rutile phase. In some embodiments, the metal oxide nanoparticle may include a titanium oxide component having a rutile phase and no anatase phase will be detectable in the metal oxide nanoparticle. In some embodiments, the metal oxide nanoparticle may include a titanium oxide component having a rutile phase and no anatase phase will be detectable in the metal oxide nanoparticle by XRD analysis.

According to one or more embodiments of the present disclosure, an average diameter of the metal oxide nanoparticle may be about 1 nm to about 30 nm.

According to one or more embodiments of the present disclosure, the metal oxide nanoparticle may form an island type coating layer on a surface of the silicon-based active material substrate.

According to one or more embodiments of the present disclosure, an amount of the metal oxide nanoparticle may be about 0.01 wt % to about 10 wt % based on a total weight of the negative active material.

According to one or more embodiments of the present disclosure, the silicon-based active material substrate may include at least one of silicon, silicon oxide, silicon alloy, and a silicon-carbon composite.

According to one or more embodiments of the present disclosure, the silicon alloy may include silicon and at least one metal selected from magnesium (Mg), calcium (Ca), strontium (Sr), barium (Ba), radon (Ra), scandium (Sc), yttrium (Y), lanthanum (La), titanium (Ti), zirconium (Zr), hafnium (Hf), vanadium (V), niobium (Nb), tantalum (Ta), chromium (Cr), molybdenum (Mo), tungsten (W), manganese (Mn), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), zinc (Zn), cadmium (Cd), boron (B), aluminum (Al), gallium (Ga), phosphorus (P), arsenic (As), stibium (Sb), bismuth (Bi), sulfur (S), selenium (Se), tellurium (Te), and polonium (Po).

According to one or more embodiments of the present disclosure, the silicon alloy may be at least one of Si—Fe, Si—Al, Si—Mg, Si—Ti, Si—Cr, Si—Ni, Si—Cu, Si—Ti—Ni, Si—Fe—Al, Si—Fe—O, Si—Cu—Ni, Si—Mg—Ni, Si—Ti—Ni—Al, and Si—Fe—Ti—Al.

According to one or more embodiments of the present disclosure, an amount of silicon in the silicon alloy may be 40 at % or greater.

According to one or more embodiments of the present disclosure, the silicon-based active material substrate may have an average diameter of about 0.1 μm to about 100 μm.

According to one or more embodiments of the present disclosure, provided is a negative electrode including the negative active material described above.

According to one or more embodiments of the present disclosure, provided is a lithium battery including the negative electrode described above.

According to one or more embodiments of the present disclosure, provided is a method of preparing a negative active material, the method including mixing a silicon-based active material substrate, a metal oxide precursor, and a solvent to prepare a mixture solution; drying the mixture solution to prepare a dried product; and heat treating the dried product. In some embodiments, the metal oxide precursor may be a metal salt comprising at least one metal selected from the group consisting of titanium (Ti), zirconium (Zr), nickel (Ni), cobalt (Co), manganese (Mn), chromium (Cr), zinc (Zn), molybdenum (Mo), tantalum (Ta), boron (B), manganese (Mg), calcium (Ca), strontium (Sr), barium (Ba), vanadium (V), iron (Fe), copper (Cu), and aluminum (Al). In some embodiments, the metal oxide precursor may be compound of Formula 2: $M(OR)_x$, wherein, $1 \leq x \leq 5$; R may be an optionally substituted $C_{1-20}$ alkyl; and M may be selected from the group consisting of Ti, Zr, Ni, Co, Mn, Cr, Zn, Mo, Ta, B, Mg, Ca, Sr, Ba, V, Fe, Cu, and Al. In some embodiments, the heat treating may be performed in a nitrogen or air atmosphere at a temperature of 700° C. or greater. In some embodiments, the heat treating may be performed in a nitrogen or air atmosphere at a temperature of about 800° C. to about 900° C. In some embodiments, M may be Ti. In some embodiments, the metal oxide precursor may be titanium isopropoxide $Ti(OCH(CH_3)_2)_4$.

According to one or more embodiments of the present disclosure, the metal oxide derivative may be a metal salt including at least one metal selected from the group consisting of titanium (Ti), zirconium (Zr), nickel (Ni), cobalt (Co), manganese (Mn), chromium (Cr), zinc (Zn), molybdenum (Mo), tantalum (Ta), boron (B), manganese (Mg), calcium (Ca), strontium (Sr), barium (Ba), vanadium (V), iron (Fe), copper (Cu), and aluminum (Al).

According to one or more embodiments of the present disclosure, an amount of the metal oxide derivative may be about 0.01 wt % to about 20 wt % based on a total weight of the silicon-based active material substrate and the metal oxide.

According to one or more embodiments of the present disclosure, the heat treating may be performed in a nitrogen or air atmosphere at a temperature of 700° C. or greater.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
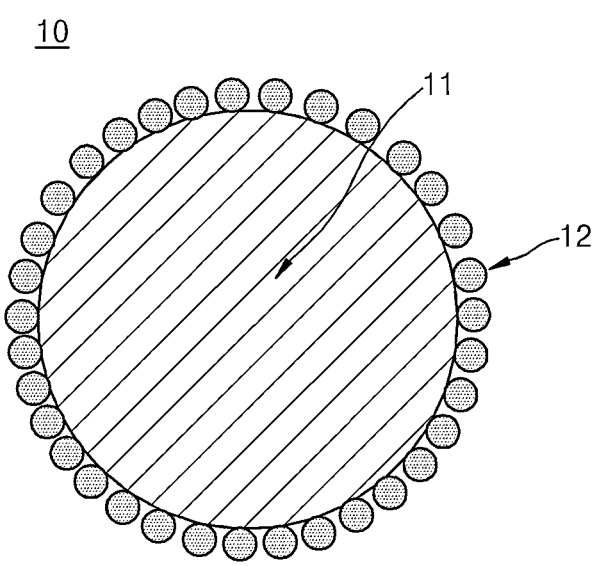
FIG. 1 schematically illustrates a structure of a negative active material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Additional aspects will be set forth in part in the description which follows and, in part, will be apparent from the description, or may be learned by practice of the presented embodiments.

Hereinafter, embodiments will be described in greater detail.

Some embodiments provide a negative active material including:

a silicon-based active material substrate; and a metal oxide nanoparticle disposed on a surface of the silicon-based active material substrate, wherein the metal oxide nanoparticle has an angle of diffraction 2θ having a peak at 27°~28° in an x-ray diffraction (XRD) pattern obtained using CuKα rays.

In the expression "silicon-based active material substrate" as used herein, the term "silicon-based" refers to including at least 40 at % of silicon (Si). For example, the silicon-based active material substrate may include at least about 50 at %, about 60 at %, 70 at %, 80 at %, or 90 at % of Si, or may include 100 at % of Si. As an amount of Si increases, a high capacity negative active material may be prepared. In some embodiments the silicon-based active material substrate may be a Si alloy.

As used herein, the term "at %" means atomic composition percentage of each element where the total amount is 100%.

According to an embodiment, the Si-based active material substrate may include at least one of Si, a Si oxide, a Si alloy, a Si-carbon composite.

In some embodiments, the Si oxide may be represented by $SiO_x$ (0<x<2).

In some embodiments, the Si alloy may be represented as a Si—Z alloy (wherein, the Z is an alkali metal, an alkaline earth metal, a Group 13 element, a Group 14 element, a Group 15 element, a Group 16 element, a transition metal, a rare earth element, or a combination thereof, and is not Si). In the Si—Z alloy, element Z may be selected from the group consisting of magnesium (Mg), calcium (Ca), strontium (Sr), barium (Ba), radon (Ra), scandium (Sc), yttrium (Y), lanthanum (La), titanium (Ti), zirconium (Zr), hafnium (Hf), vanadium (V), niobium (Nb), tantalum (Ta), chromium (Cr), molybdenum (Mo), tungsten (W), manganese (Mn), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), zinc (Zn), cadmium (Cd), boron (B), aluminum (Al), gallium (Ga), phosphorus (P), arsenic (As), stibium (Sb), bismuth (Bi), sulfur (S), selenium (Se), tellurium (Te), polonium (Po), and a combination thereof.

In some embodiments, the Si alloy may include Si and at least one metal selected from the group consisting of Mg, Ca, Sr, Ba, Ra, Sc, Y, La, Ti, Zr, Hf, V, Nb, Ta, Cr, Mo, W, Mn, Tc, Re, Fe, Ru, Os, Co, Rh, Ir, nickel (Ni), Pd, Pt, Cu, Ag, Au, Zn, Cd, B, Al, Ga, P, As, Sb, Bi, S, Se, Te, and Po.

In some embodiments, the Si alloy may include Si and at least two metals selected from the group consisting of Mg, Ca, Sr, Ba, Ra, Sc, Y, La, Ti, Zr, Hf, V, Nb, Ta, Cr, Mo, W, Mn, Tc, Re, iron (Fe), Ru, Os, Co, Rh, Ir, Ni, Pd, Pt, Cu, Ag, Au, Zn, Cd, B, Al, Ga, P, As, Sb, Bi, S, Se, Te, and Po.

For example, the Si alloy may be a secondary alloy such as Si—Fe, Si—Al, Si—Mg, Si—Ti, Si—Cr, Si—Ni, or Si—Cu. For example, when the Si alloy is represented as Si-M'-M", M' is Al, Ti, or Fe, and M" is Ni, Fe, or Mn. For example, the Si alloy may be a ternary alloy such as Si—Ti—Ni, Si—Fe—Al, Si—Mn—Al, Si—Fe—Ti, Si—Fe—Mn, Si—Al—Ni, Si—Fe—O, Si—Cu—Ni, or Si—Mg—Ni. For example, the Si alloy may be a quaternary alloy such as Si—Ti—Ni—Al or Si—Fe—Ti—Al.

Stoichiometry of each metal component may be suitably determined according to battery characteristics within a range in which a total stoichiometry is 100 at %. For example, in the Si alloy represented by Si-M'-M", Si may be included in a range of about 40 at % to about 80 at %, M' may be included in a range of about 10 at % to about 30 at %, and M" may be included in a range of about 10 at % to about 30 at %. In greater detail, in the Si alloy, Si may be included in a range of about 60 at % to about 80 at %, M' may be included in a range of about 10 at % to about 20 at %, and M" may be included in a range of about 10 at % to about 20 at %.

According to an embodiment, Si in the Si alloy may be a mixture of inactive Si and active Si. The active Si is directly related to a capacity of the Si alloy and the inactive Si has an inactive matrix structure and prevents volumetric expansion of the Si alloy. In some embodiments, the active Si may precipitate and disperse as a nanoparticle in the inactive matrix. The Si nanoparticle may be crystalline or amorphous.

An amount of the active Si may be about 40 at % to about 80 at %, based on 100 at % of a sum of total amounts of the active Si and the inactive Si. When the amount of the active Si is within the range above, volumetric expansion of the Si alloy-based negative active material may be effectively prevented during charging and discharging and capacity characteristics of electrodes may be excellent.

In some embodiments, the inactive Si along with other metal components may form an inactive matrix in an alloy form. In some embodiments, an amount of the inactive Si may be in a range of about 20 at % to about 60 at % based on 100 at % of a total amount of the active Si and the inactive Si. In some embodiments, the matrix may include about 40 at % to about 60 at % of Si, about 20 at % to about 30 at % of M', and about 20 at % to about 30 at % of M".

As such, the Si alloy having a structure in which the Si nanoparticle is precipitated and dispersed in the inactive matrix allows the inactive matrix surrounding the Si nanoparticle to effectively control volumetric changes of Si when the Si nanoparticle expands during charging and discharging. Accordingly, the Si alloy having such a structure may decrease an expansion rate of the electrode during charging and discharging.

In some embodiments, the Si-based active material substrate may have a powder form. For example, the Si-based active material substrate may have an average diameter of about 100 μm or less. For example, the Si-based active material substrate may have an average diameter of about 50 μm or less, about 30 μm or less, about 20 μm or less, about 10 μm or less, or about 5 μm or less. For example, the Si-based active material substrate may have an average diameter in a range of about 0.01 μm to about 100 μm, about 0.1 μm to about 50 μm, about 1 μm to about 30 μm, about 5 μm to about 10 μm, or about 1 μm to about 5 μm.

In some embodiments, the Si-based active material substrate having the diameter in the range described above may be resilient with respect to volumetric changes of the negative active material related to charging and discharging of the lithium battery.

The term average diameter as used herein refers to D50, which corresponds to a diameter of a particle at 50% from the smallest particle in a cumulative distribution curve, when a total number of particles is 100% in the cumulative distribution curve, in which particles are accumulated from the smallest to the largest. D50 may be measured by a method well known in the art, for example, D50 may be measured by a particle size analyzer, or may be measured from a transmission electron microscope (TEM) image or a scanning electron microscope (SEM) image. Also, D50 may be measured by using a measuring device using dynamic light-scattering, and then the data obtained therefrom may be analyzed to count the number of particles in each size range and D50 may be easily calculated therefrom.

In some embodiments, a metal oxide nanoparticle may be disposed on the surface of the Si-based active material substrate.

FIG. 1 schematically illustrates a structure of a negative active material according to an embodiment. In this case, the negative active material 10 has a metal oxide nanoparticle 12 uniformly disposed on a surface of a Si-based active material substrate 11. However, the metal oxide nanoparticle 12 may be non-uniformly disposed or may be disposed as an island type, as described below.

In some embodiments, a metal in a metal oxide of the metal oxide nanoparticle 12 may be at least one selected from Group 2 or Group 13 elements from the periodic table of elements. Accordingly, the metal oxide does not include an element from Group 1, and Groups 14-16.

For example, the metal in the metal oxide may be at least one selected from the group consisting of Ti, Zr, Ni, Co, Mn, Cr, Zn, Mo, Ta, B, Mg, Ca, Sr, Ba, V, Fe, Cu, and Al.

For example, the metal oxide may be represented by Formula 1 below:

$$M_aO_b \qquad \text{Formula 1}$$

In Formula 1, $1 \leq a \leq 4$, $1 \leq b \leq 10$, and M is at least one selected from the group consisting of Ti, Zr, Ni, Co, Mn, Cr, Zn, Mo, Ta, B, Mg, Ca, Sr, Ba, V, Fe, Cu, and Al.

For example, the metal oxide may include at least one selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, and tantalum pentoxide. For example, TiOx ($1 \leq x \leq 2$), $Al_2O_3$, $ZrO_2$, or the like may be used as the metal oxide. For example, TiOx ($1 \leq x \leq 2$) may be used as the metal oxide, and in greater detail, $TiO_2$ may be used.

In some embodiments, an average diameter of the metal oxide nanoparticle 12 may be about 1 nm to about 30 nm. For example, the average diameter of the metal oxide nanoparticle 12 may be about 5 nm to about 25 nm or about 10 nm to about 20 nm.

In some embodiments, the metal oxide nanoparticle 12 may have a coating layer formed on the Si-based active material substrate 11. In some embodiments, the coating layer including the metal oxide nanoparticle 12 may exist between the Si-based active material substrate 11 and an electrolyte to improve interface stability of the Si-based active material substrate, to thereby improve lifespan characteristics. When the metal oxide nanoparticle 12 has lithium ion conductivity, the metal oxide nanoparticle 12 not only acts as a barrier that prevents direct contact between the electrolyte and a Si-based active material, but also as a pathway for lithium ion mobility.

In some embodiments, the metal oxide nanoparticle 12 may be inactive with respect to lithium. For example, the metal oxide may not react with lithium and may not form a lithium oxide. Hence, the metal oxide is not a negative active material that may intercalate/deintercalate lithium, but is a conductor that simply provides a transfer pathway for lithium ions and/or electrons, and the metal oxide may form a protective layer that prevents a side reaction between the metal oxide nanoparticle 12 and the electrolyte. In some embodiments, the metal oxide nanoparticle 12 may form a protective layer that acts as an electrical insulator and prevents a side reaction between the Si-based active material substrate 11 and the electrolyte.

In some embodiments, the metal oxide nanoparticle 12 may form an island type coating layer on a surface of the Si-based active material substrate 11. In this regard, the term "island" type as used herein refers to a form in which a plurality of metal oxide nanoparticles are combined to have a predetermined volume, and may have various forms such as a spherical form, a semi-spherical form, a non-spherical form, or an atypical form. In some embodiments, the metal oxide nanoparticle may 12 be of an island type, as the metal oxide nanoparticle 12 is uniformly or non-uniformly dispersed on the surface of the Si-based active material substrate 11.

In some embodiments, the metal oxide nanoparticle 12 may include a component that has an angle of diffraction 2θ having a main peak at 27°~28° in an x-ray diffraction (XRD) pattern obtained using CuKα rays. In some embodiments, the metal oxide nanoparticle may include a component that further has an angle of diffraction 2θ having a second and a third peak at 36°~37° and 55°~56°, respectively.

In some embodiments, the metal oxide nanoparticle 12 having the XRD peak characteristics described above may include a component having a rutile phase. In some embodiments, the rutile phase may be, for example, titanium oxide having a microcrystalline lattice structure, but the rutile phase is not limited thereto.

The XRD peak characteristics of the rutile phase are different from XRD peak characteristics of an anatase phase. A metal oxide including a component having the anatase phase may have an angle of diffraction 2θ having a main peak at about 25° to about 26°, about 37° to about 38°, and further having a second or a third peak at about 48°.

Figure 2A:
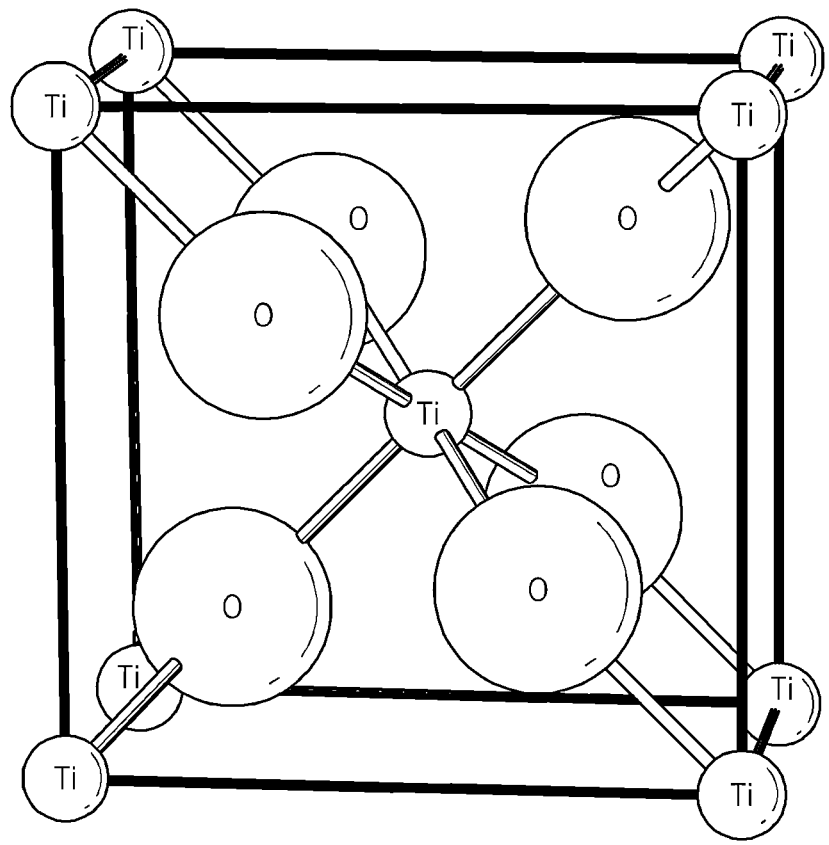
FIG. 2A illustrates a unit cell of rutile and FIG. 2B illustrates a unit cell of anatase.
Figure 2B:
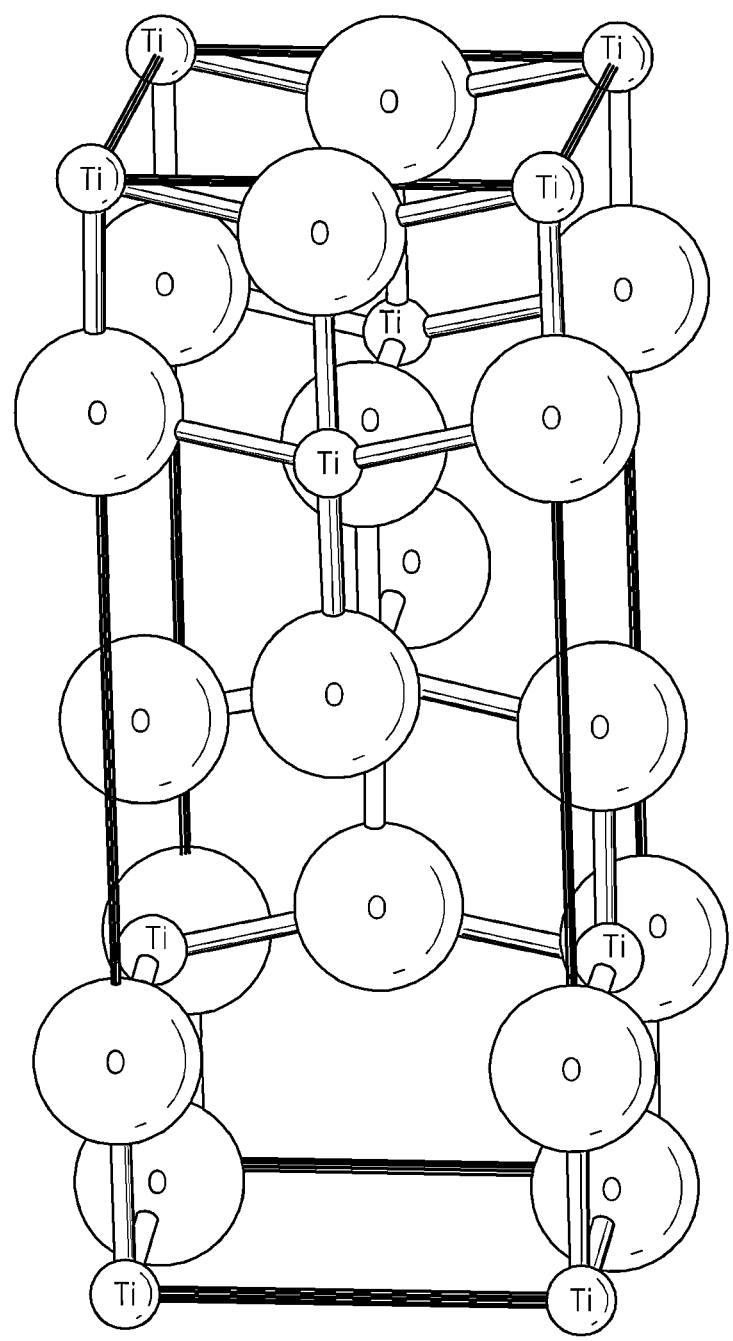

FIG. 2A illustrates a unit cell of rutile and FIG. 2B illustrates a unit cell of anatase. It may be concluded from Examples, which will be described later below, that the metal oxide nanoparticle having the rutile phase improves lifespan characteristics more effectively than the metal oxide nanoparticle having the anatase phase.

A method of forming the rutile phase is not particularly limited as long as the method is known in the related art. In some embodiments, the metal oxide having the rutile phase may be obtained by, for example, coating the Si-based active material substrate with a coating solution including a metal oxide precursor and then heat-treating the resultant thereof at a temperature of about 700° C. or greater. A rultile phase begins to form at a temperature of about 700° C. or greater. Formation of the rutile phase may be confirmed by XRD spectroscopy. In some embodiments, the product only includes a rutile phase and does not include an anatase phase when a heat-treatment temperature is 800° C. or greater. To obtain only the rutile phase, the heat-treatment temperature may be about 800° C. to about 900° C.

In the negative active material, an amount of the metal oxide nanoparticle may be about 0.01 wt % to about 10 wt % based on a total weight of the negative active material. For example, the amount of the metal oxide nanoparticle may be about 0.1 wt % to about 5 wt %, or about 0.5 wt % to about 2 wt % based on the total weight of the negative active material. When the amount of the metal oxide nanoparticle is in the range described above, lifespan characteristics may be effectively improved.

As described above, the negative active material may have the metal oxide nanoparticle disposed on the surface of the Si-based active material substrate to improve interface stability between the Si-based active material substrate and the electrolyte to improve lifespan characteristics of the lithium battery.

A negative electrode according to another embodiment includes the negative active material.

The negative electrode may be prepared by, for example, molding a negative active material composition including a negative active material, a binder, and optionally a conductive agent in a predetermined shape or coating the negative active material composition on a current collector such as a copper foil.

In greater detail, a negative active material composition including a mixture of a negative active material, a conductive agent, and a binder, and a solvent is prepared. In some embodiments, the negative active material composition is directly coated on a metal current collector to manufacture a negative electrode plate. In some embodiments, the negative active material composition is cast on a separate support, and then a film is peeled off from the support and then laminated on a metal current collector to manufacture a negative electrode plate. The form of the negative electrode plate is not limited to the forms listed above and may differ from the forms described above.

In some embodiments, the negative active material composition may further include a negative electrode material conventionally used as the negative active material in a lithium battery of the related art, in addition to the negative active material described above. For example, the negative active material composition may further include at least one selected from the group consisting of lithium metal, a metal alloyable with lithium, a transition metal oxide, a non-transitional metal oxide, and a carbonaceous material.

For example, the metal alloyable with lithium may be Si, Sn, Al, Ge, Pb, Bi, a Sb Si—Y alloy (wherein, Y is an alkali metal, an alkaline earth metal, a Group 13 element, a Group 14 element, a transition metal, a rare earth metal element, or a combination thereof, but not Si), a Sn—Y alloy (wherein Y is an alkali metal, an alkaline earth metal, a Group 13 element, a Group 14 element, a transition metal, a rear earth metal element, or a combination thereof, but not Sn). In some embodiments, the element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may be a lithium titanium oxide, a vanadium oxide, or a lithium vanadium oxide.

For example, the transition metal oxide may be $SnO_2$ or $SiO_x$ (0<x<2).

Examples of the carbonaceous material include crystalline carbon, amorphous carbon, or a mixture thereof. The crystalline carbon may be natural graphite or synthetic graphite having an amorphous form, a flat form, a flake form, a spherical form, or a fiber form, and the amorphous carbon may be soft carbon (low temperature calcined carbon), hard carbon, mesophase pitch carbide, calcined coke, and a combination thereof.

The binder may be any binder used in the art such as polyvinylidene fluoride, polyvinylidene chloride, polybenzimidazole, polyimide, polyvinyl acetate, polyacrylonitrile, polyvinyl alcohol, carboxymethylcellulose (CMC), starch, hydroxypropyl cellulose, regenerated cellulose, polyvinylpyrrolidone, polyethylene, polypropylene, polystyrene, polymethylmethacrylate, polyaniline, acrylonitrile butadiene styrene, a phenol resin, an epoxy resin, polyethylene terephthalate, polytetrafluoroethylene, polyphenylene sulfide, polyamideimide, polyetherimide, polyethylenesulfone, polyamide, polyacetal, polyphenylene oxide, polybutylene terephthalate, ethylene-propylene-diene terpolymer (EPDM), sulfonated ethylene-propylene-diene terpolymer, styrene butadiene rubber, fluoride rubber, and various copolymers, but the binder is not limited thereto. An amount of the binder may be about 1 part by weight to about 50 parts by weight based on 100 parts by weight of the negative active material. In greater detail, the amount of the binder may be about 1 part by weight to about 30 parts by weight, 1 part by weight to about 20 parts by weight, or about 1 part by weight to about 15 parts by weight based on 100 parts by weight of the negative active material.

In some embodiments, the negative electrode may optionally further include a conductive agent to provide a conductive pathway to the negative active material, to thereby further improve electrical conductivity. The conductive agent may be a carbonaceous material such as carbon black, acetylene black, Ketjen black, carbon fiber, or the like; a metal powder of copper, nickel, aluminum, or silver; or a conductive material such as polyphenylene derivative. However, the conductive agent is not limited thereto and any conductive agent used in the art may be used. Also, the crystalline carbonaceous material may be further added as the conductive agent. An amount of the conductive agent may be appropriately controlled. For example, the conductive agent may be added in such an amount that a weight ratio of the negative active material to the conductive agent is in a range of about 99:1 to about 90:10.

In some embodiments, the solvent may be N-methylpyrrolidone (NMP), acetone, water, or the like, but the solvent is not limited thereto and may be any solvent used in the art.

Amounts of the negative active material, the conductive agent, the binder, and the solvent are amounts suitable for a lithium battery. One or more of the conductive agent, the binder, and the solvent may be omitted depending on use and composition of a lithium battery.

Also, the current collector may typically be formed in a thickness of about 3 μm to about 500 μm. The current collector is not particularly limited as long as the current collector does not cause a chemical change in a battery and has conductivity. Examples of a material that forms the current collector are copper, stainless steel, aluminum, nickel, titanium, calcined carbon, copper and stainless steel that are surface-treated with carbon, nickel, titanium, silver, or the like, an alloy of aluminum and cadmium, etc. Also, an uneven micro structure may be formed on the surface of the current collector to enhance a binding strength to the negative active material. Also, the current collector may be used in various forms including a film, a sheet, a foil, a net, a porous structure, a foaming structure, a nonwoven structure, etc.

A lithium battery according to another embodiment includes a negative electrode including the negative active material. The lithium battery may be manufactured as follows.

First, a negative electrode is prepared according to the method of preparing the negative electrode.

Then, a positive active material composition in which a positive active material, a conductive agent, a binder, and a solvent are mixed is prepared. In some embodiments, the positive active material composition is directly coated and dried on a metal current collector to prepare a positive electrode plate. In some embodiments, the positive active material composition is cast on a separate support and then a film peeled off from the support may be laminated on a metal current collector to manufacture a positive electrode plate.

In some embodiments, the positive active material may include at least one selected from the group consisting of a lithium cobalt oxide, a lithium nickel cobalt manganese oxide, a lithium nickel cobalt aluminum oxide, a lithium iron phosphate, and a lithium manganese oxide, but the positive active material is not necessarily limited thereto and may be any positive active material used in the art.

For example, at least one compound represented by any one formula of
$Li_aA_{1-b}B^1_bD^1_2$ (wherein, $0.90 \leq a \leq 1.8$, and $0 \leq b \leq 0.5$);
$Li_aE_{1-b}B^1_bO_{2-c}D^1_c$ (wherein, $0.90 \leq a \leq 1.8$, $0 \leq b \leq 0.5$, and $0 \leq c \leq 0.05$);
$LiE_{2-b}B^1_bO_{4-c}D^1_c$ (wherein, $0 \leq b \leq 0.5$, and $0 \leq c \leq 0.05$);
$Li_aNi_{1-b-c}Co_bB^1_cD^1_\alpha$ (wherein, $0.90 \leq a \leq 1.8$, $0 \leq b \leq 0.5$, $0 \leq c \leq 0.05$, and $0 < \alpha \leq 2$);
$Li_aNi_{1-b-c}Co_bB^1_cO_{2-\alpha}F^1_\alpha$ (wherein, $0.90 \leq a \leq 1.8$, $0 \leq b \leq 0.5$, $0 \leq c \leq 0.05$, and $0 < \alpha < 2$);
$Li_aNi_{1-b-c}Co_bB^1_cO_{2-\alpha}F^1_2$ (wherein, $0.90 \leq a \leq 1.8$, $0 \leq b \leq 0.5$, $0 \leq c \leq 0.05$, and $0 < \alpha < 2$);
$Li_aNi_{1-b-c}Mn_bB^1_cD^1_\alpha$ (wherein, $0.90 \leq a \leq 1.8$, $0 \leq b \leq 0.5$, $0 \leq c \leq 0.05$, and $0 < \alpha \leq 2$);
$Li_aNi_{1-b-c}Mn_bB^1_cO_{2-\alpha}F^1_\alpha$ (wherein, $0.90 \leq a \leq 1.8$, $0 \leq b \leq 0.5$, $0 \leq c \leq 0.05$, and $0 < \alpha < 2$);
$Li_aNi_{1-b-c}Mn_bB^1_cO_{2-\alpha}F^1_2$ (wherein, $0.90 \leq a \leq 1.8$, $0 \leq b \leq 0.5$, $0 \leq c \leq 0.05$, and $0 < \alpha < 2$);
$Li_aNi_bE_cG_dO_2$ (wherein, $0.90 \leq a \leq 1.8$, $0 \leq b \leq 0.9$, $0 \leq c \leq 0.5$, and $0.001 \leq d \leq 0.1$.);
$Li_aNi_bCo_cMn_dGeO_2$ (wherein, $0.90 \leq a \leq 1.8$, $0 \leq b \leq 0.9$, $0 \leq c \leq 0.5$, $0 \leq d \leq 0.5$, and $0.001 \leq e \leq 0.1$.);
$Li_aNiG_bO_2$ (wherein, $0.90 \leq a \leq 1.8$, and $0.001 \leq b \leq 0.1$.);
$Li_aCoG_bO_2$ (wherein, $0.90 \leq a \leq 1.8$, and $0.001 \leq b \leq 0.1$.);
$Li_aMnG_bO_2$ (wherein, $0.90 \leq a \leq 1.8$, and $0.001 \leq b \leq 0.1$.);
$Li_aMn_2G_bO_4$ (wherein, $0.90 \leq a \leq 1.8$, and $0.001 \leq b \leq 0.1$.);
$QO_2$; $QS_2$; $LiQS_2$; $V_2O_5$;
$LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ may be used.

In the formulae above, A may be Ni, Co, Mn, or a combination thereof; $B^1$ may be Al, Ni, Co, Mn, Cr, Fe, Mg, Sr, V, a rare earth metal element, or a combination thereof; $D^1$ may be O (oxygen), F (fluorine), S (sulfur), P (phosphorus), or a combination thereof; E may be Co, Mn, or a combination thereof; $F^1$ may be F (fluorine), S (sulfur), P (phosphorus), or a combination thereof; G may be Al, Cr, Mn, Fe, Mg, La, Ce, Sr, V, or a combination thereof; Q may be Ti, Mo, Mn, or a combination thereof; $I^1$ may be Cr, V, Fe, Sc, Y, or a combination thereof; and J may be V, Cr, Mn, Co, Ni, Cu, or a combination thereof.

In some embodiments, the compound may have a coating layer thereon, or the compound and the compound having a coating layer thereon may be mixed together. In some embodiments, the coating layer may include a coating element compound of an oxide of a coating element, a hydroxide of the coating element, an oxyhydroxide of the coating element, an oxycarbonate of the coating element, or a hydroxycarbonate of the coating element. In some embodiments, the compound forming the coating layer may be amorphous or crystalline. In some embodiments, the coating element included in the coating layer may be Mg, Al, Co, potassium (K), sodium (Na), calcium (Ca), Si (Si), Ti, V, tin (Sn), germanium (Ge), gallium (Ga), boron (B), arsenic (As), zirconium (Zr), or a combination thereof. A method of forming the coating layer may be any method (for example, spray coating or immersion) that does not negatively affect properties of the positive electrode by using the element in the compound, and the method is well known to one of ordinary skill in the art and thus, the description thereof will be omitted herein.

For example, $LiNiO_2$, $LiCoO_2$, $LiMn_xO_{2x}$ (x=1, 2), $LiNi_{1-x}Mn_xO_2$ ($0<x<1$), $LiNi_{1-x-y}Co_xMn_yO_2$ ($0 \leq x \leq 0.5$, $0 \leq y \leq 0.5$), $LiFeO_2$, $V_2O_5$, TiS, or MoS may be used.

In some embodiments, the conductive agent, the binder, and the solvent in the positive active material composition may be the same as those in the negative active material composition. Also, a plasticizer may be further added to the positive active material composition and/or negative active material composition to form pores inside an electrode.

Amounts of the positive active material, the conductive agent, the binder, and the solvent are amounts suitable for a lithium battery. One or more of the conductive agent, the binder, and the solvent may be omitted depending on use and composition of a lithium battery.

Then, a separator to be inserted between the positive electrode and the negative electrode is prepared. The separator may be any separator used for a lithium battery. The separator may have a low resistance to migration of ions of an electrolyte and an excellent electrolytic solution-retaining capability. For example, the separator may be selected from the group consisting of glass fiber, polyester, polyethylene, polypropylene, polytetrafluoroethylene (PTFE), and a combination thereof, each of which may be nonwoven or woven. For example, a separator that may be rolled, such as polyethylene or polypropylene, may be used in a lithium ion battery, and a separator having an excellent solution-retaining capability may be used in a lithium ion polymer battery. For example, the separator may be prepared by the method as described below.

A polymer resin, a filler, and a solvent are mixed to prepare a separator composition. In some embodiments, the separator composition may be directly coated and then dried on an electrode to prepare a separator. In some embodiments, the separator composition may be cast and then dried on a support, and a separator film peeled off from the support may be laminated on the electrode to prepare a separator.

The polymer resin used for preparing the separator is not particularly limited and any material used as a binder for an electrode plate may be used. For example, vinylidene fluoride/hexafluoropropylene copolymer, polyvinylidene fluoride (PVDF), polyacrylonitrile, polymethyl methacrylate, or a combination thereof may be used.

Then, an electrolyte is prepared.

The electrolyte includes a non-aqueous electrolyte and a lithium salt. The non-aqueous electrolyte may be a non-aqueous electrolyte solution, an organic solid electrolyte, and an inorganic solid electrolyte.

The non-aqueous electrolyte solution may be, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydrofuran, 2-methyl tetrahydrofuran, dimethyl sulfoxide, 1,3-dioxolane, 4-methyl-dioxolane, formamide, N,N-dimethyl formamide, acetonitrile, nitromethane, methyl formate, methyl acetate, phosphoric acid triester, trimethoxy methane, a dioxolane derivative, sulfolane, methyl sulfolane, 1,3-dimethyl-2-imidazolinone, a propylene carbonate derivative, a tetrahydrofuran derivative, ether, methyl propionate, or ethyl propionate.

The organic solid electrolyte may be, for example, a polyethylene derivative, a polyethylene oxide derivative, a polypropylene oxide derivative, a phosphoric acid ester polymer, polyester sulfide, polyvinyl alcohol, polyvinylidene fluoride, or a polymer containing an ionic dissociation group.

The inorganic solid electrolyte may be, for example, Li nitride, halogenide, sulfide, and silicate such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any salt used in a lithium battery. As a material that may be dissolved well in the non-aqueous electrolyte, for example, at least one of $LiCl$, $LiBr$, $LiI$, $LiClO_4$, $LiB_{10}Cl_{10}$, $LiPF_6$, $CF_3SO_3Li$, $CH_3SO_3Li$, $C_4F_3SO_3Li$, $(CF_3SO_2)_2NLi$, $LiN(C_xF_{2x+1}SO_2)(C_yF_{2+y}SO_2)$ (wherein, x and y are natural numbers of 1 to 20, respectively), $CF_3CO_2Li$, $LiAsF_6$, $LiSbF_6$, $LiAlCl_4$, $LiAlF_4$, lithium chloroborate, lower aliphatic carbonic acid lithium, 4-phenyl boric acid lithium, lithium imide, etc. may be used.

Lithium batteries may be categorized into lithium ion batteries, lithium ion polymer batteries, or lithium polymer batteries, according to a separator used and an electrolyte used. Lithium batteries may also be categorized into cylindrical lithium batteries, rectangular lithium batteries, coin-shaped lithium batteries, or pouch-shaped lithium batteries, according to the shape thereof. Lithium batteries may also be categorized as bulk-type lithium batteries or thin layer-type lithium batteries, according to the size thereof. The lithium batteries may also be primary batteries or secondary batteries.

A method of manufacturing a lithium battery is known to one of ordinary skill in the art, and thus, will not be described in detail herein.

Figure 3:
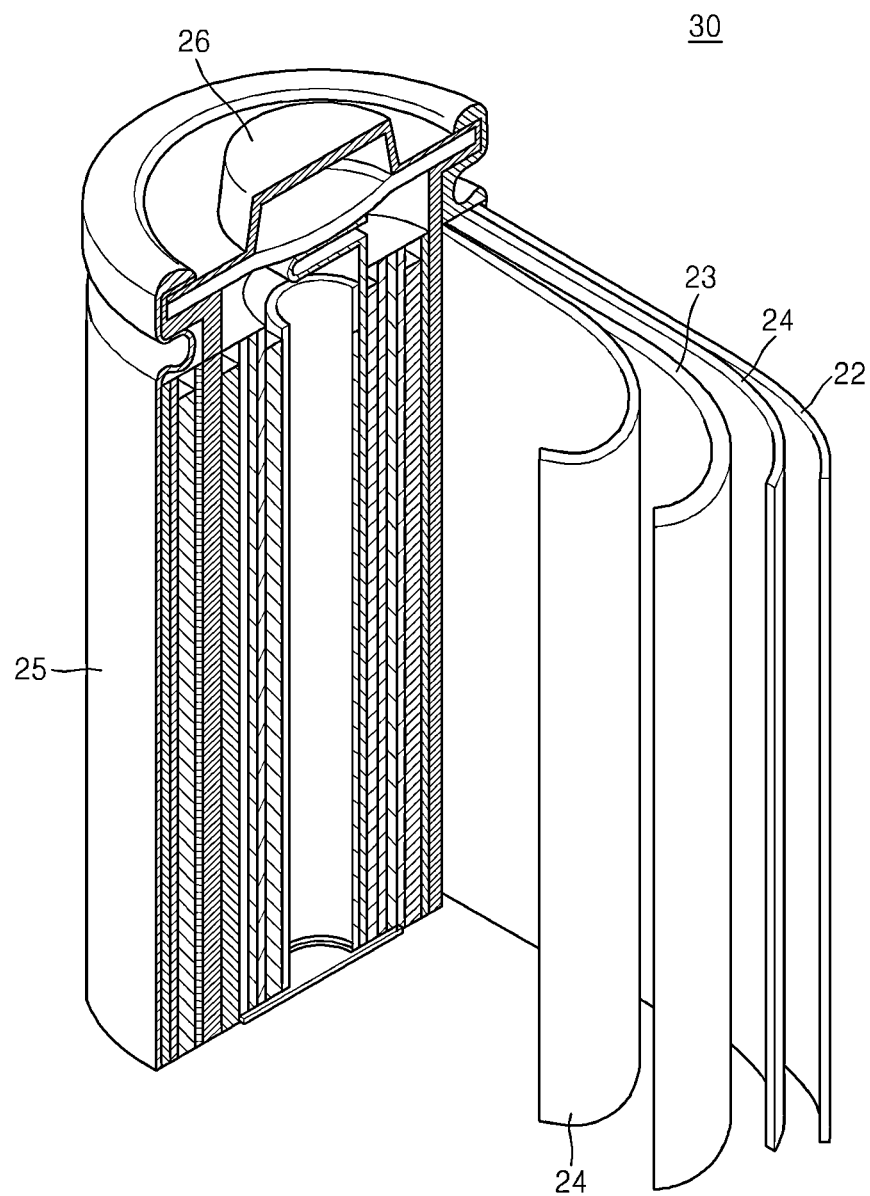
FIG. 3 is a schematic view of a lithium battery according to an embodiment.

FIG. 3 is a schematic view of a lithium battery 30 according to an embodiment.

Referring to FIG. 3, the lithium battery 30 includes a positive electrode 23, a negative electrode 22, and a separator 24 interposed between the positive and negative electrodes 22 and 23. In some embodiments, the positive electrode 23, the negative electrode 22, and the separator 24 are wound or folded to be housed in a battery case 25. Then, an electrolyte is injected into the battery case 25, followed by sealing the battery case 25 with an encapsulation member 26, thereby completing the manufacture of the lithium battery 30. In some embodiments, the battery case 25 may be a cylindrical, rectangular, or thin film type case. In some embodiments, the lithium battery 30 may be a lithium ion battery.

A lithium battery according to an embodiment may be used in an application, such as an electric vehicle that requires high capacity, high power output, and high-temperature driving, in addition to existing mobile phones or portable computers. Also, the lithium battery may be combined with an existing internal-combustion engine, a fuel cell, a super capacitor, or the like for use in a hybrid vehicle, or the like. More particularly, the lithium battery has excellent high rate capability and lifespan characteristics and thus, is suitable for an electric vehicle (EV). For example, the lithium battery is suitable for a plug-in hybrid electric vehicle (PHEV).

Some embodiments provide a method of preparing a negative active material including:

mixing a Si-based active material substrate, a metal oxide precursor, and a solvent to prepare a mixture solution;

drying the mixture solution to prepare a dried product; and heat treating the dried product.

In some embodiments, the metal oxide precursor may be a metal salt including at least one metal selected from the group consisting of titanium (Ti), zirconium (Zr), nickel (Ni), cobalt (Co), manganese (Mn), chromium (Cr), zinc (Zn), molybdenum (Mo), tantalum (Ta), boron (B), manganese (Mg), calcium (Ca), strontium (Sr), barium (Ba), vanadium (V), iron (Fe), copper (Cu), and aluminum (Al). In some embodiments, the metal salt may be hydride, oxyhydride, alkoxide, nitrate, or carbonate.

For example, metal alkoxide may be used as a metal oxide derivative. The metal alkoxide may be an organic metal compound in which an alkoxide group is coordinated to a metal ion and may be in a sol form.

For example, the metal alkoxide may be represented by Formula 2 below.

M(OR)$_x$   Formula 2 wherein, $1 \leq x \leq 5$, R may be an optionally substituted $C_{1-20}$ alkyl, and M may be selected from the group consisting of Ti, Zr, Ni, Co, Mn, Cr, Zn, Mo, Ta, B, Mg, Ca, Sr, Ba, V, Fe, Cu, and Al.

In some embodiments, an amount of the metal oxide may be about 0.01 wt % to about 20 wt %, for example, about 0.01 wt % to about 10 wt %, about 0.1 wt % to about 5 wt %, or about 0.1 wt % to about 1 wt % based on a total weight of the Si-based active material substrate and the metal oxide precursor. When the amount of the metal alkoxide is too small, an amount of coating may be small and thus, coating effects may be small and when the amount of the metal alkoxide is too great, specific capacity of the battery may decrease.

In some embodiments, the solvent may be water, alcohol, or a combination thereof, and the alcohol may be C1-C4 lower alcohol, detailed examples of which are methanol, ethanol, isopropanol, or a combination thereof. However, the solvent is not limited thereto and any solvent known in the related art that may be used to achieve the purpose of the manufacturing method may be used.

In some embodiments of the manufacturing method described above, a crystalline carbon-based substrate, the metal oxide derivative, and the solvent may be mixed to prepare a mixture solution, which may be dried to obtain a dried product, and the dried product may be heat treated to obtain a negative active material on which a metal oxide nanoparticle is formed on a surface of the crystalline carbon-based substrate.

In some embodiments, the heat treatment may be performed in a nitrogen or atmospheric environment at a temperature of 700° C. or greater. At a heat treatment temperature of 700° C. or greater, a rutile phase may be formed, and at 700° C. or less, only an anatase phase may be obtained. For example, when the heat treatment temperature is 700° C. or greater but less than 800° C., a mixture of both the anatase phase and the rutile phase may be obtained and when the heat treatment temperature is 800° C. or greater, a metal oxide nanoparticle in which only the rutile phase is present may be formed. According to an embodiment, the heat treatment may be performed at a temperature of about 800° C. to about 900° C. for about 30 minutes or about 10 hours.

In some embodiments, the manufacturing method may further include grinding a heat treatment product obtained from the heat treatment.

In some embodiments, the negative active material may be prepared by a dry method including mechanically mixing a metal oxide particle with the Si-based active material substrate to form a coating layer including the metal oxide nanoparticle on the Si-based active material substrate, in addition to the wet method described above. In some embodiments, the mixing method may be a mechanofusion method or the like. In some embodiments, the dry method may further include forming the metal oxide nanoparticle on the Si-based active material substrate and then heat treating the same.

Hereinafter, exemplary embodiments will be described in detail with reference to examples. However, the examples are illustrated for illustrative purpose only and do not limit the scope.

Preparing a Negative Active Material

Manufacturing Example 1

1.5 wt % Rutile Coating Phase

First, silicon (Si) alloy powder was prepared as a Si-based active material substrate.

Each of Si and Fe was mixed in proportions of 25 at % and 75 at %, respectively, to prepare a mixture, and then the mixture was inserted into a vacuum induction melting furnace (available from Yein Tech., Busan, Korea), and the mixture was dissolved under vacuum to inhibit atmospheric oxidation to prepare a mother alloy.

The mother alloy was pulverized into large lumps, which were inserted into an injection tube of a melt spinner (available from Yein Tech., Busan, Korea), the mother alloy was melted in an argon gas atmosphere by using high-frequency induction heating, molten mother alloy was sprayed on a rotating Cu wheel to shape the molten mother alloy into a ribbon form, and then the resultant thereof was rapidly solidified to prepare an alloy ribbon.

The alloy ribbon was pulverized by using a ball mill to obtain Si alloy powder of $Fe_3Si$ composition, having an average diameter (D50) of about 3 μm to about 5 μm.

25 g of the Si alloy powder and 1.32 g of titanium isopropoxide (($Ti(OCH(CH_3)_2)_4$ (product number: 205273, available from Aldrich, St. Louis, Mo.) were added to 200 ml of isopropyl alcohol and then mixed to prepare a mixture solution. In a heatable agitator, the mixture solution was agitated at a temperature of 100° C. at 300 rpm to remove a solvent, to thereby obtain dried powder. The dried powder was calcined in a nitrogen ($N_2$) atmosphere at a temperature of 800° C. for 1 hour to obtain a calcined product. The calcined product was pulverized to prepare a negative active material coated with the Si alloy powder coated with $TiO_2$ nanoparticles having 1.5 wt % of a rutile phase.

Manufacturing Example 2

0.5 wt % of Rutile Coating Phase

A negative active material was manufactured in the same manner as in Manufacturing Example 1, except that the surface of the Si alloy powder was coated with the $TiO_2$ nanoparticles having 0.5 wt % of a rutile phase.

Comparative Manufacturing Example 1

1.5 wt % of Anatase Coating Phase

A negative active material was prepared in the same manner as in Manufacturing Example 1, except that the surface of the Si alloy powder was coated with 1.5 wt % of $TiO_2$ nanoparticles having an anatase phase at a calcination temperature of 600° C.

Comparative Manufacturing Example 2

0.5 wt % of Anatase Coating Phase

A negative active material was manufactured in the same manner as in Comparative Manufacturing Example 1, except that the surface of the Si alloy powder was coated with the $TiO_2$ nanoparticles having 0.5 wt % of an anatase phase.

Comparative Manufacturing Example 3

Without Coating

The Si alloy powder prepared in Manufacturing Example 1 was used as a negative active material without any coating treatment on the surface of the Si alloy powder.

Manufacturing a Coin Half-Cell

A coin half-cell was manufactured in the manner described below to confirm lifespan characteristics of lithium batteries according to a coating phase.

Example 1

The negative active material prepared in Manufacturing Example 1 and poly amide imide (PAI) acting as a binder were mixed at a weight ratio of 90:10 to prepare negative active material slurry.

The prepared negative active material slurry (9 mg/cm$^2$) was coated on a copper foil current collector having a thickness of 10 μm to prepare a coated electrode plate. The coated electrode plate was dried at a temperature of 120° C. for 15 minutes and then pressed to prepare a negative electrode.

Li metal was used as a counter electrode, a polyethylene separator (separator, STAR 20, available from Asahi Kasei, Tokyo Japan) was used as a separator, a mixture solvent of ethylene carbonate (EC):ethyl methyl carbonate (EMC): diethyl carbonate (DEC) (volume ratio of 3:3:4) in which 1.15 M of LiPF$_6$ is dissolved was used as an electrolyte to manufacture a coin half cell.

Comparative Example 1

A coin half-cell was manufactured in the same manner as in Example 1, except that the negative active material prepared in Comparative Manufacturing Example 1 was used instead of the negative active material prepared in Manufacturing Example 1.

Comparative Example 2

A coin half-cell was manufactured in the same manner as in Example 1, except that the negative active material prepared in Comparative Manufacturing Example 3 was used instead of the negative active material prepared in Manufacturing Example 1.

Manufacturing a Coin Full Cell

A coin full cell was manufactured in the manner described below to confirm lifespan characteristics of lithium batteries according to an amount of coating.

Example 2

A mixture powder in which the Si alloy coated with TiO$_2$ nanoparticles having 1.5 wt % of rutile phase prepared in Manufacturing Example 1 and graphite are mixed at a ratio of 2:8 was used as a negative active material. The negative active material and polyamide imide (PAI) were mixed at a weight ratio of 90:10 to prepare a negative active material slurry.

The prepared negative active material slurry (9 mg/cm$^2$) was coated on a copper foil current collector having a thickness of 10 μm to prepare a coated electrode plate. The coated electrode plate was dried at a temperature of 120° C. for 15 minutes and then pressed to prepare a negative electrode.

For a positive electrode, LiCoO$_2$ (LCO) as a positive active material, carbon black as a conductive agent, and polyvinylidene fluoride (PVdF) as a binder were mixed at a weight ratio of 97.5:1:1.5 of the positive active material, the conductive agent, and a binder solution to prepare a positive active material slurry.

The positive active material slurry (18 mg/cm$^2$) was coated on an aluminum foil current collector having a thickness of 12 μm to prepare a coated electrode plate. The coated electrode plate was dried at a temperature of 120° C. for 15 minutes and then pressed to prepare a positive electrode.

The positive and the negative electrodes described above were respectively used, a polyethylene separator (separator, STAR 20, available from Asahi Kasei, Tokyo Japan) was used as a separator, and a mixture solvent of ethylene carbonate (EC):ethyl methyl carbonate (EMC):diethyl carbonate (DEC) (volume ratio of 3:3:4) in which 1.15 M of LiPF$_6$ is dissolved was used as an electrolyte to manufacture a coin full cell.

Example 3

A coin full cell was manufactured in the same manner as in Example 2, except that a mixture powder of the Si alloy coated with 0.5 wt % of a rutile phase prepared in Manufacturing Example 2 and graphite was used when preparing the negative active material.

Comparative Example 3

A coin full cell was manufactured in the same manner as in Example 2, except that a mixture powder of the Si alloy coated with 1.5 wt % of an anatase phase prepared in Comparative Manufacturing Example 1 and graphite was used when preparing the negative active material.

Comparative Example 4

A coin full cell was manufactured in the same manner as in Example 2, except that a mixture powder of the Si alloy coated with 0.5 wt % of an anatase phase prepared in Comparative Manufacturing Example 2 and graphite was used when preparing the negative active material.

Comparative Example 5

A coin full cell was manufactured in the same manner as in Example 2, except that a mixture powder of the uncoated Si alloy prepared in Comparative Manufacturing Example 3 and graphite was used when preparing the negative active material.

Evaluation Example 1

Confirming Coating State

Figure 4:
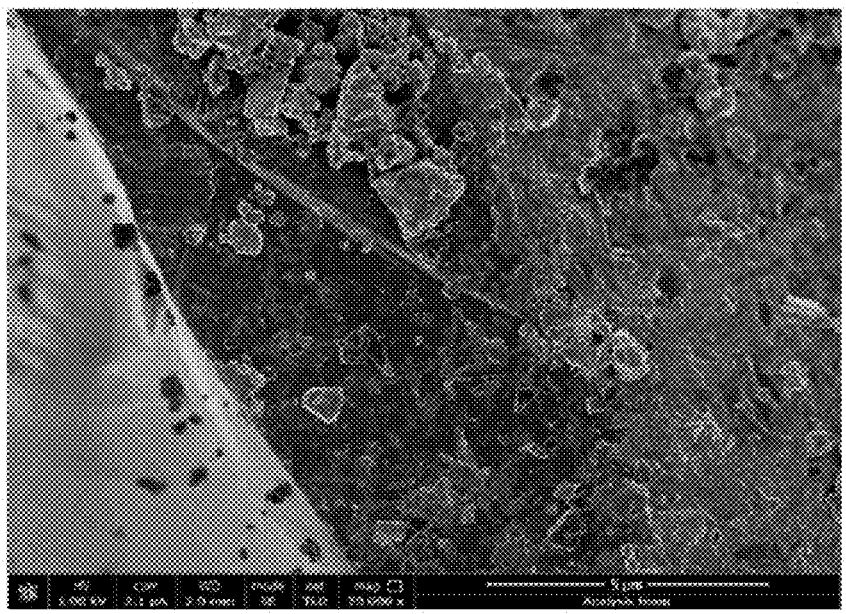
FIG. 4 is a field emission scanning electron microscope (FE-SEM) image of a silicon alloy substrate after the heat treatment in Example 1.

To confirm the coating state of the negative active material prepared in Manufacturing Example 1, a field emission scanning electron microscope (FE-SEM) image of Si alloy powder after calcination was captured and is shown in FIG. 4.

As shown in FIG. 4, the TiO$_2$ nanoparticles are coated as an island type on a Si alloy substrate after calcination. The negative active material on which TiO$_2$ nanoparticles are coated as an island type may have better lithium ion mobility than the TiO$_2$ nanoparticles coated as a complete layer type.

Evaluation Example 2

XRD Analysis

Figure 5:
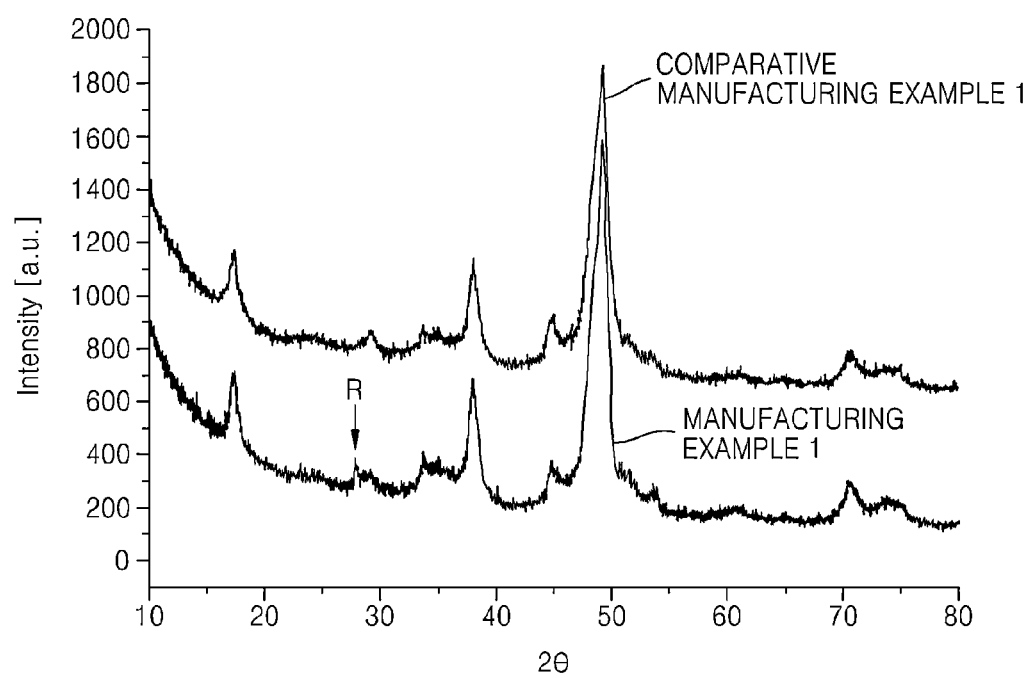
FIG. 5 shows XRD analysis results of the negative active materials prepared in Manufacturing Example 1 and Comparative Manufacturing Example 1.

FIG. 5 shows XRD analysis results of the negative active materials prepared in Manufacturing Example 1 and Comparative Manufacturing Example 1 obtained by using CuKα rays. In FIG. 5, R stands for a rutile phase of TiO$_2$.

As shown in FIG. 5, because a product obtained from coating the Si alloy powder with $TiO_2$ and heat treating at 800° C. (Manufacturing Example 1) shows a main peak of a rutile phase near 28°, it may be concluded that the product is coated with $TiO_2$ having a rutile phase and a product obtained from heat treating at 600° C. does not include any $TiO_2$ having a rutile phase.

Figure 6:
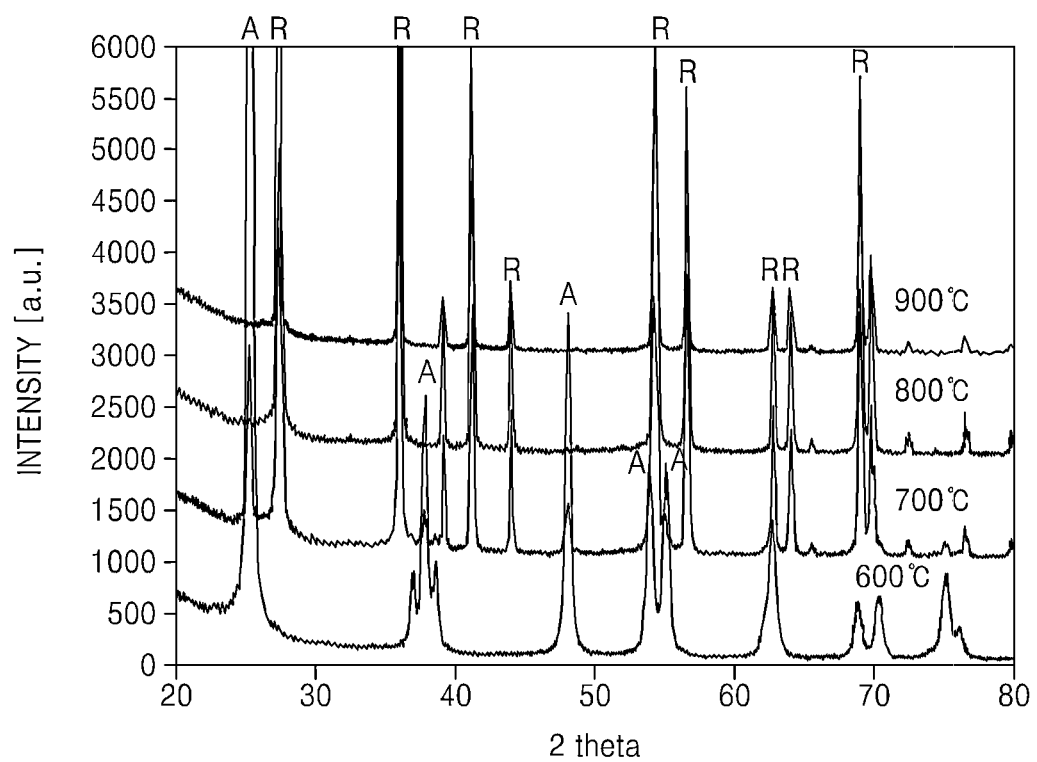
FIG. 6 shows XRD analysis results showing a crystalline phase of $TiO_2$ according to heat treatment temperatures.

In addition, to observe changes to $TiO_2$ crystalline phase according to heat treatment temperatures, XRD analysis results of $TiO_2$ nanoparticles obtained after heat treating a graphite-free titanium isopropoxide solution respectively at 600° C., 700° C., 800° C., and 900° C. are shown in FIG. 6.

As shown in FIG. 6, a product obtained from heat treating at 800° C. or greater only includes rutile, at 700° C. includes a mixture phase of rutile and anatase, and at 600° C. only includes anatase. These results coincide with the results obtained in FIG. 5.

Evaluation Example 3

Evaluation of Battery Characteristics

To evaluate lithium battery lifespan characteristics according to a coating phase, the coin half-cells prepared in Example 1 and Comparative Examples 1 and 2 were galvanostatically charged at a temperature of 25° C. and at a current of 0.2 C rate until voltage reached 0.01 V (vs. Li), and then were charged at a constant voltage until current reached 0.01 C while maintaining 0.01 V. Thereafter, the coin half-cells were discharged at an galvanostatic current of 0.2 C until voltage reached 1.5 V (vs. Li).

Thereafter, the lithium batteries were galvanostatically charged at a current of 0.5 C rate until voltage reached 0.01 V (vs. Li) and then charged at a constant voltage until current reached 0.01 C while maintaining 0.01 V. Thereafter, the coin half-cells were discharged at a galvanostatic current of 0.5 C until voltage reached 1.5 V (vs. Li) (formation process).

The coin half-cells after the formation process were galvanostatically charged at a temperature of 60° C. and at a current of 1.0 C rate until voltage reached 0.01 V (vs. Li), and then the coin half-cells were charged at a constant voltage until current reached 0.01 C while maintaining 0.01 V. Thereafter, the coin half-cells were discharged at an galvanostatic current of 1.0 C until voltage reached 1.5 V (vs. Li). The entire cycle was repeated 100 times.

Initial efficiency results of the coin half-cells manufactured in Example 1, and Comparative Examples 1 and 2 are shown in Table 1. Initial efficiency is determined by charge-discharge efficiency (CDE) defined by Equation 1 below.

Initial efficiency [%]=[discharge capacity in $1^{st}$ cycle/charge capacity in $1^{st}$ cycle]×100   Equation 1

TABLE 1

|  | Discharge capacity (mAh/g) | Charge capacity (mAh/g) | Initial efficiency (%) |
| --- | --- | --- | --- |
| Example 1 (rutile) | 875 | 1,023 | 85.5 |
| Comparative Example 1 (anatase) | 871 | 1,030 | 84.6 |
| Comparative Example 2 (coating X) | 893 | 1,021 | 87.5 |

Figure 7:
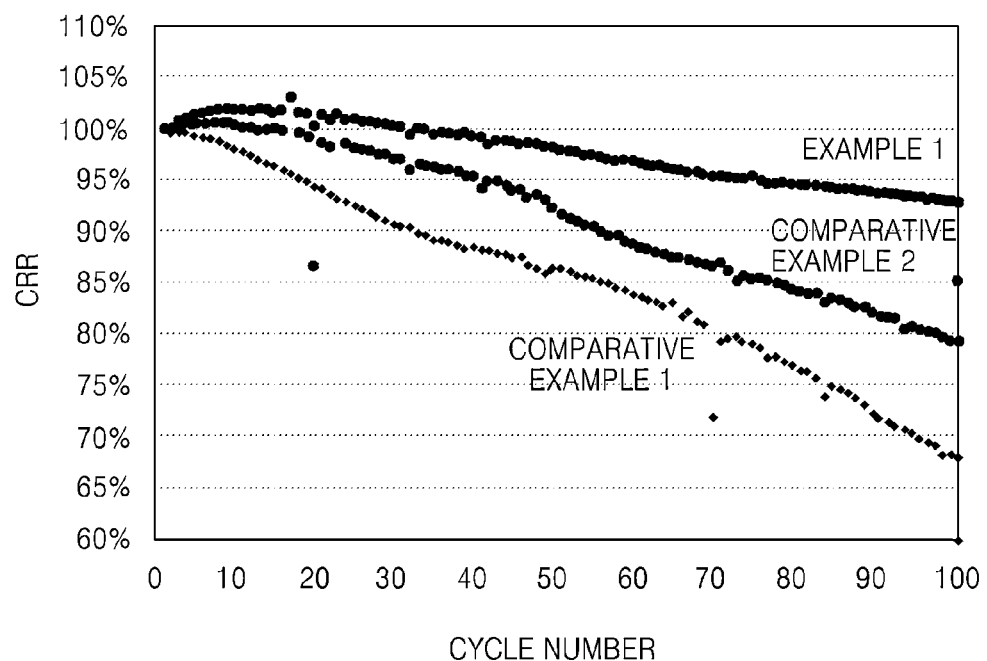
FIG. 7 is a graph showing lifespan characteristics of the coin half-cells manufactured in Example 1 and Comparative Examples 1 and 2. This shows lifespan characteristics of the coin half-cells according to coating.

Also, capacity retention rates of the coin half-cells manufactured in Example 1, and Comparative Examples 1 and 2 are shown in FIG. 7. A capacity retention ratio (CRR) is defined by Equation 2 below.

Capacity retention ratio [%]=[discharge capacity in each cycle/discharge capacity in $1^{st}$ cycle]×100   Equation 2

As shown in FIG. 7, when the $TiO_2$ nanoparticles having a rutile phase are coated on the Si-based active material substrate (Example 1), the initial irreversible capacity of the lithium battery increases compared to when the $TiO_2$ nanoparticles are not coated on the Si-based active material substrate (Comparative Example 2), but decreases compared to when the $TiO_2$ nanoparticles having an anatase phase are coated on the Si-based active material substrate (Comparative Example 1), and thus the lithium battery is advantageous in terms of initial efficiency and has improved lifespan characteristics.

Evaluation Example 4

Evaluation of Battery Characteristics According to an Amount of Coating

To evaluate lithium battery lifespan characteristics according to an amount of coating, the coin full cells prepared in Examples 2 and 3, and Comparative Examples 3 to 5 were galvanostatically charged at a temperature of 25° C. and at a current of 0.2 C rate until voltage reached 4.3 V (vs. Li), and then were charged at a constant voltage until current reached 0.02 C while maintaining 4.3 V. Thereafter, the coin full cells were discharged at a galvanostatic current of 0.2 C until voltage reached 2.75 V (vs. Li) (formation process).

The coin full cells after the formation process were galvanostatically charged at a temperature of 60° C. and at a current of 0.5 C rate until voltage reached 4.3 V (vs. Li), and then the coin full cells were charged at a constant voltage until current reached 0.02 C while maintaining 4.3 V. Thereafter, the coin full cells were galvanostatically discharged at a current of 0.2 C until voltage reached 2.75 V (vs. Li). The entire cycle was repeated 70 times.

Figure 8:
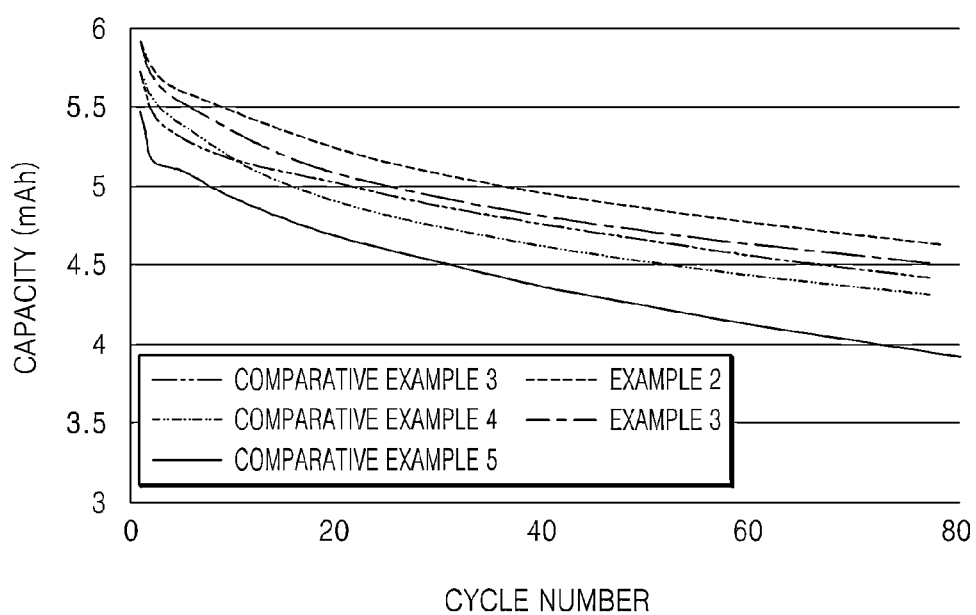
FIG. 8 is a graph illustrating lifespan characteristics of the coin full cells prepared in Examples 2 and 3, and Comparative Examples 3-5. The graph shows lifespan characteristics of the coin full cells according to amounts of coating.

Capacity retention rates of the coin half-cells manufactured in Examples 2 and 3, and Comparative Examples 3 to 5 are shown in FIG. 8.

As shown in FIG. 8, it may be concluded that even when the amount of coating changes, lifespan maintenance characteristics improve when the $TiO_2$ nanoparticles having a rutile phase are coated on the Si alloy powder (Examples 2 and 3) compared to when the $TiO_2$ nanoparticles having the anatase phase is coated on the Si alloy powder (Comparative Examples 3 and 4) and when the $TiO_2$ nanoparticles are not coated on the Si alloy powder (Comparative Example 1-5).

Evaluation Example 5

Evaluation of High Temperature Storage Characteristics

To evaluate high temperature storage characteristics, the coin half-cells manufactured in Example 1, and Comparative Examples 1 and 2 were fully charged at 0.01 V (0.01 C cutoff) and then stored at a temperature of 90° C. for three days. Thereafter, Solatron apparatus (1470E available from Solatron) was used to measure AC-impedance of the coin half-cells before and after storage at an alternating current of 0.5 mV in a range of about 1000 Hz to about 0.1 Hz.

Impedance measurement results of the coin half-cells manufactured in Example 1 and Comparative Examples 1 and 2 before and after high temperature storage at 90° C. for three days are shown in [Table 2].

TABLE 2

| | Impedance before storage (Ω) | Impedance after storage (Ω) | Rate of increase (%) |
|---|---|---|---|
| Example 1 (rutile) | 55 | 68 | 24 |
| Comparative Example 1 (anatase) | 57 | 77 | 35 |
| Comparative Example 2 (coating X) | 53 | 76 | 43 |

As shown in Table 2, it may be concluded that when the $TiO_2$ nanoparticles having a rutile phase is coated on the Si alloy powder (Example 1), increase in resistance of the coin half-cell during a high temperature storage is smaller than when the $TiO_2$ nanoparticles having an anatase phase are coated on the Si alloy powder (Comparative Example 1) and when the $TiO_2$ nanoparticles are not coated (Comparative Example 2), which suggests that high temperature storage characteristics of the coin half-cell including the $TiO_2$ nanoparticles having a rutile phase coated on the Si alloy powder are excellent.

As described above, according to the one or more of the above embodiments, lifespan characteristics of a lithium battery may be improved by using the negative active material.

It should be understood that the exemplary embodiments described herein should be considered in a descriptive sense only and not for purposes of limitation. Descriptions of features or aspects within each embodiment should typically be considered as available for other similar features or aspects in other embodiments.

In the present disclosure, the terms "Example," "Comparative Example" "Manufacturing Example," "Comparative Manufacturing Example," and "Evaluation Example" are used arbitrarily to simply identify a particular example or experimentation and should not be interpreted as admission of prior art. While one or more embodiments of the present disclosure have been described with reference to the figures, it will be understood by those of ordinary skill in the art that various changes in form and details may be made therein without departing from the spirit and scope of the present embodiments as defined by the following claims.

What is claimed is:

1. A negative active material comprising:
   a silicon active material substrate; and
   metal oxide nanoparticles disposed on a surface of the silicon active material substrate, wherein the metal oxide nanoparticles include a component having a rutile phase, wherein an average diameter of the metal oxide nanoparticles is about 1 nm to about 30 nm.

2. The negative active material of claim 1, wherein the metal oxide nanoparticles have an angle of diffraction 2θ having a peak at 27°~28° in an x-ray diffraction (XRD) pattern obtained using CuKα rays.

3. The negative active material of claim 1, wherein the silicon active material substrate is from about 40 at % to about 90 at % silicon.

4. The negative active material of claim 1, wherein the metal oxide nanoparticle comprises as a main component at least one selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, and tantalum pentoxide, and wherein at least 90 wt % of the metal oxide nanoparticle is the main component.

5. The negative active material of claim 1, wherein the metal oxide nanoparticles form an island type coating layer on a surface of the silicon active material substrate.

6. The negative active material of claim 1, wherein an amount of the metal oxide nanoparticle is about 0.01 wt % to about 10 wt % based on a total weight of the negative active material.

7. The negative active material of claim 1, wherein the silicon active material substrate comprises at least one of silicon, silicon oxide, silicon alloy, and a silicon-carbon composite.

8. The negative active material of claim 7, wherein the silicon active material substrate is a silicon alloy and the silicon alloy comprises silicon and at least one metal selected from magnesium (Mg), calcium (Ca), strontium (Sr), barium (Ba), radon (Ra), scandium (Sc), yttrium (Y), lanthanum (La), titanium (Ti), zirconium (Zr), hafnium (Hf), vanadium (V), niobium (Nb), tantalum (Ta), chromium (Cr), molybdenum (Mo), tungsten (W), manganese (Mn), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), zinc (Zn), cadmium (Cd), boron (B), aluminum (Al), gallium (Ga), phosphorus (P), arsenic (As), stibium (Sb), bismuth (Bi), sulfur (S), selenium (Se), tellurium (Te), and polonium (Po).

9. The negative active material of claim 8, wherein the silicon alloy is represented by Si-M'-M", Si is included in a range of about 40 at % to about 80 at %, M' is included in a range of about 10 at % to about 30 at %, and M" is included in a range of about 10 at % to about 30 at %, where M' is Al, Ti, or Fe, and M" is Ni, Fe, or Mn, and where M' and M" are different from each other.

10. The negative active material of claim 7, wherein the silicon active material substrate is a silicon alloy and the silicon alloy is at least one of Si—Fe, Si—Al, Si—Mg, Si—Ti, Si—Cr, Si—Ni, Si—Cu, Si—Ti—Ni, Si—Fe—Al, Si—Fe—O, Si—Cu—Ni, Si—Mg—Ni, Si—Ti—Ni—Al, and Si—Fe—Ti—Al.

11. The negative active material of claim 1, wherein the silicon active material substrate is in the form of particles and the particles have an average diameter of about 0.1 μm to about 100 μm.

12. A lithium battery comprising: a negative electrode; and a positive electrode, said negative electrode comprising the negative active material of claim 1.

13. A method of preparing the negative active material of claim 1, the method comprising:
   mixing a silicon active material substrate, a metal oxide precursor, and a solvent to prepare a mixture solution;
   drying the mixture solution to prepare a dried product; and
   heat treating the dried product.

14. The method of claim 13, wherein the metal oxide precursor is a metal salt comprising at least one metal selected from the group consisting of titanium (Ti), zirconium (Zr), nickel (Ni), cobalt (Co), manganese (Mn), chromium (Cr), zinc (Zn), molybdenum (Mo), tantalum (Ta), boron (B), manganese (Mg), calcium (Ca), strontium (Sr), barium (Ba), vanadium (V), iron (Fe), copper (Cu), and aluminum (Al).

15. The method of claim 13, wherein the metal oxide precursor is compound of Formula 2:

$M(OR)_x$, wherein, $1 \leq x < 5$; R is an optionally substituted $C_{1-20}$ alkyl; and M is selected from the group consisting of Ti, Zr, Ni, Co, Mn, Cr, Zn, Mo, Ta, B, Mg, Ca, Sr, Ba, V, Fe, Cu, and Al.

16. The method of claim 15, wherein M is Ti.

17. The method of claim 16, wherein the metal oxide precursor is titanium isopropoxide $Ti(OCH(CH_3)_2)_4$.

18. The method of claim 13, wherein the heat treating is performed in a nitrogen or air atmosphere at a temperature of 700° C. or greater.

19. The method of claim 18, wherein the heat treating is performed in a nitrogen or air atmosphere at a temperature of about 800° C. to about 900° C.

* * * * *